(No Model.)
E. P. COWLES.
Car Truck.
No. 233,989.        Patented Nov. 2, 1880.
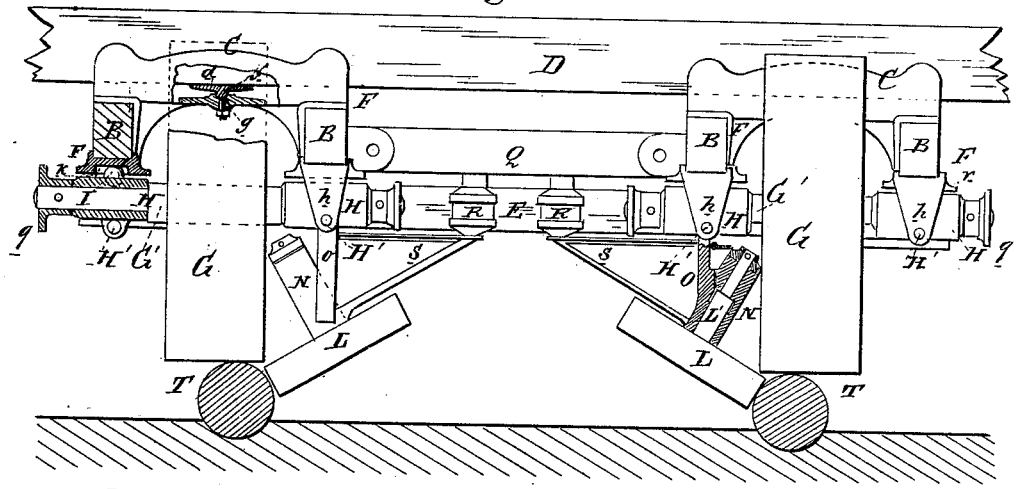
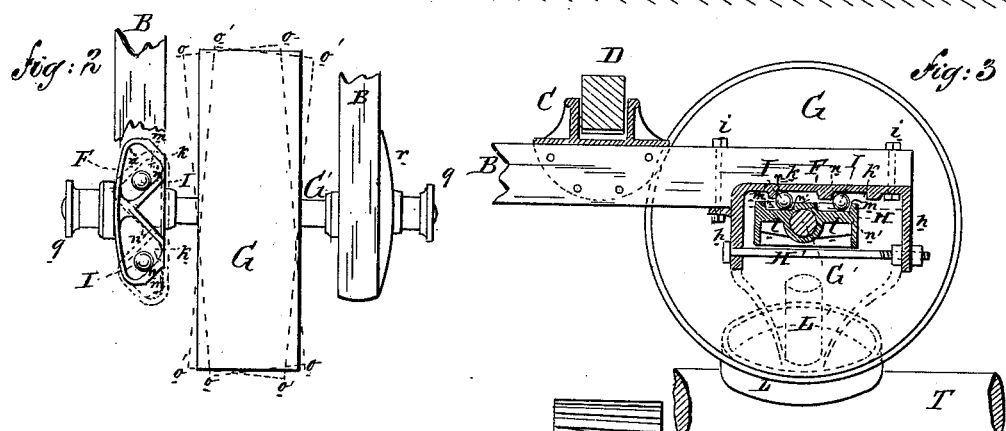
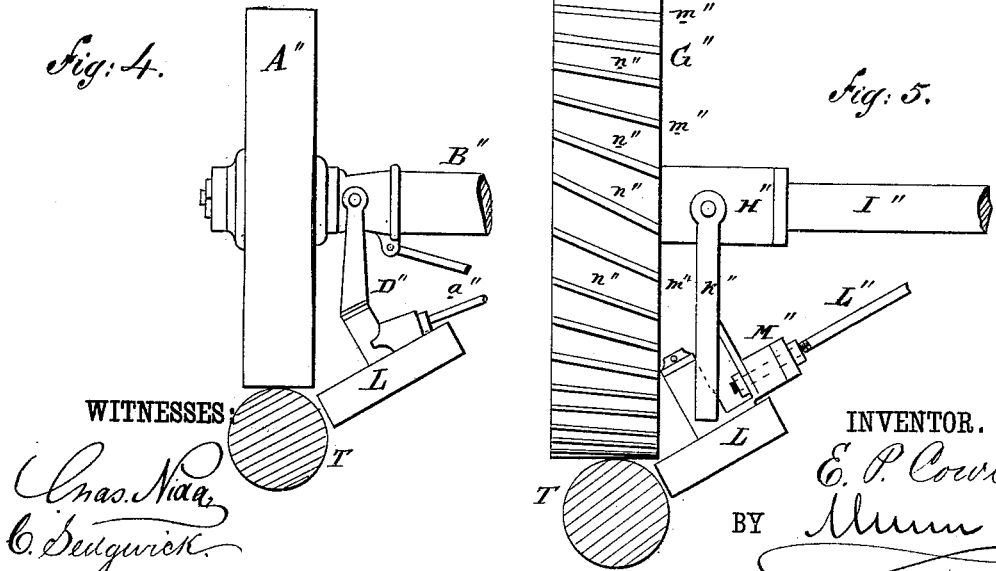
WITNESSES:
Chas. Nida
C. Sedgwick
INVENTOR.
E. P. Cowles,
BY Munn & Co.
ATTORNEYS.
N. PETERS, PHOTO-LITHOGRAPHER, WASHINGTON, D. C.

UNITED STATES PATENT OFFICE.

EDWARD P. COWLES, OF WEQUIOCK, WISCONSIN.

CAR-TRUCK.

SPECIFICATION forming part of Letters Patent No. 233,989, dated November 2, 1880.

Application filed August 27, 1880. (No model.)

*To all whom it may concern:*

Be it known that I, EDWARD P. COWLES, of Wequiock, in the county of Brown and State of Wisconsin, have invented a new and useful Improvement in Running-Gear of Cars or other Vehicles, of which the following is a specification.

The object of this invention is to provide running-gear for a car or other vehicle designed especially to run on round rails, and to avoid the use of flanged wheels and the friction and abrasion caused by them.

The invention consists of a car-frame of novel design provided with flat-faced vertical wheels to run on the top of the track, and with inclined flat-faced guide-wheels that run under the inside edges of the flat wheels squarely against the side of the track; and it consists, further, of novel devices for permitting the free motion of the main wheels, and of other improvements, hereinafter fully described.

Figure 1 is an end elevation of the car, partly in section. Fig. 2 is a plan of a main wheel and a portion of a car with a portion of the car-sill removed to exhibit other parts. Fig. 3 is a sectional side elevation, showing a section of a journal-box and other parts. Fig. 4 is an end elevation, showing a modification of certain parts of the device. Fig. 5 is an end elevation, showing the improved device attached to a traction-engine to adapt it to run on a wooden tramway.

Similar letters of reference indicate corresponding parts.

In the drawings, A represents a car provided with four sills, B B, in pairs, running lengthwise of the car, each pair of sills B B being connected by bolster-plates C C, that form a trough or socket for the bunk D, that rests on rocking plates $d$, which are provided with downward projections $f$, that fit in grooves $g$ in the center of said bolster-plates C C, whereby the bunk D is allowed to rock slightly, leaving the whole frame free to twist on an uneven track. The bunk D is thus arranged especially for hauling logs.

The sills B B are kept in line by a cross-timber, E, that is bolted to the under sides of the said sills B B midway between the pairs of wheels G G.

F F represent plates or hangers provided with depending lugs $h\ h$, which are secured by bolts $i\ i$ to the under sides of the sills B B, said plates F having formed in their under faces inverted triangular troughs or depressions $k\ k$, whose bases are toward the wheels G G, as shown. These wheels G G are designed to be thirty-four inches, or thereabout, in diameter, and to have flat faces or treads twelve inches wide, or thereabout, and their short axles G' G' are journaled in the boxes H H, which are secured in place by the bolts H' H', that pass horizontally through the ends of the lugs $h\ h$ of the plates or hangers F. These boxes H H have shelves $l\ l$ projecting from each side, the raised edges of which shelves $l\ l$ form triangular troughs or depressions $m\ m$, similar to those in the plates F F, and directly beneath them, but with their apices toward the wheels G G.

A ball, I, is placed in each trough or depression $m$, to afford bearings between the boxes H and the plates F, whereby the wheels G are made free to move in every direction.

As the car moves forward the friction of the wheels G on the track causes them to fall back until the balls I are engaged between the edges $n\ n'$ of the upper and lower troughs, $k\ m$, respectively. If the car is turning a curve the guide-wheels L force the car-frame around until the car-wheels G G have a tendency to move straight forward, which tendency causes them to move outward. The diagonal sides $n\ n'$ of the plates F then force the outward ends of the axles G' G' forward, while the inside ends of said axles fall back, turning the wheels G around, as shown at $o$ in dotted lines in Fig. 2, until said wheels G are tangential to the curve of the track. When the curve in the track is in the opposite direction the wheels G move to the other side and are turned, as shown in dotted lines at $o'$, Fig. 2.

When the car is backed the opposite sides of the troughs $k\ m$ engage the balls I and the wheels G are turned as before.

The end play of the axles G' G' is limited by their end flanges or collars, $q\ q$, striking on the curved side pieces, $r$, of the plates F, and this friction of the flanges or collars $q\ q$ on the curved pieces $r\ r$ also serves the purpose of forcing the axles G' G' back to their place in case the friction of the wheels G G is not sufficient to do so. The action of the wheels G G is the same in every direction, resembling in this respect a caster-wheel, and consequently all binding or slipping of the wheels is avoided when passing over curves or crooks in the track T.

In place of the usual flanges to the main wheels of the car, a guide-wheel, L, is arranged with its flat face extending beneath the inner edge of each wheel G G, so that said wheels L shall run with a diagonal pressure squarely on the inside edge of said track T. These guide-wheels L L have short diagonal axles L' L', that are journaled in boxes N, which are hinged to the ends of the arms O, that are secured to the plates F; and the boxes N have triangular braces $s$ extending inward, and connected to the cross-piece Q by the springs R, as shown in Fig. 1, which arrangement allows the guide-wheels L to yield slightly to the irregularities of the track T, which track T is designed to be made of round logs.

In Fig. 4 is shown a modification of my improved device to apply to road-trucks and adapt them to be used as cars on a tramway, wherein A'' is the truck-wheel; B'', the axle thereof; L, the guide-wheel, attached to the axle B'' by the arm D'', and moving with said axle B'' when said axle is moved to guide the truck. The braces $a''$ to the opposite end of the axle B'' hold the guide-wheels L against the track T. This modification (shown in Fig. 4) resembles that shown in Fig. 5, which is designed to apply to traction-engines and adapt them to running on wooden tramways, wherein G'' is one of the driving-wheels of a traction-engine. The spaces between the shoes $m''$ $m''$ are filled in with cast blocks $n''$, thus making the face of the wheel G'' smoother. The guide-wheel L, similar to the other guide-wheels hereinbefore shown, is connected to the bearing-box H'' on the axle I'' of the engine by the arm K''. A brace, L'', extends from the guide-wheel L to a suitable box on the other end of the axle I''. A spring, M'', between the brace L'' and the arm K'' of the guide-wheel L answers the same purpose as the springs R of the car, hereinbefore shown. This arrangement leaves the driving-wheels G'' of the engine free and admits of their being steered on the track T, the same as on a common road, enabling the said traction-engine to turn very sharp curves.

Having thus fully described my invention, I claim as new and desire to secure by Letters Patent—

1. A car constructed substantially as herein shown and described, containing the following elements: car-wheel axle-bearings consisting of plates or hangers and journal-boxes having triangular troughs and anti-friction balls, flat-faced guide-wheels to run squarely with diagonal pressure on the inside face of the track, and connected by arms, hinged boxes, braces, and springs to the car, and bolster-plates containing rocking plates for supporting the bunk, arranged and operating as set forth.

2. In a car-truck, the hangers F and boxes H, having depressions $k$ $m$ with inclined sides or edges $n$ $n'$, in combination with the ball I, as and for the purpose specified.

3. The combination, with the axles G' G', provided with flanges or collars $q$ $q$, of the plates F F, having projections $r$ $r$, substantially as herein shown and described, whereby said axles are forced back to their places, as set forth.

4. In a tramway-car, the combination, with the sills B B, of the bolster-plates C C and rocking plates $d$ $d$, substantially as and for the purpose described.

EDWARD PAYSON COWLES.

Witnesses:
I. V. SUYDAM,
ALBERT HOPPE, Jr.